(12) United States Patent
Nyberg

(10) Patent No.: US 6,477,896 B1
(45) Date of Patent: Nov. 12, 2002

(54) INDICATOR FOR REFLECTING DIRECTION OF AIRFLOW BETWEEN TWO ROOMS

(76) Inventor: Tord Nyberg, Karlavägen 15, Lidingö (SE), SE-151 81

(*) Notice: Subject to any disclaimer, the term of this patent is extended or adjusted under 35 U.S.C. 154(b) by 0 days.

(21) Appl. No.: 09/423,686

(22) PCT Filed: May 13, 1998

(86) PCT No.: PCT/SE98/00892
§ 371 (c)(1),
(2), (4) Date: Nov. 12, 1999

(87) PCT Pub. No.: WO98/52050
PCT Pub. Date: Nov. 19, 1998

(30) Foreign Application Priority Data

May 13, 1997 (SE) .................................. 9701801

(51) Int. Cl.$^7$ ................................................ G01F 3/06
(52) U.S. Cl. ...................................... 73/252; 73/861.82
(58) Field of Search .............................. 73/252, 861.88, 73/861.83, 861.55, 861.56, 861.57; 116/112, 111

(56) References Cited

U.S. PATENT DOCUMENTS

| 5,195,376 A | 3/1993 | Banks et al. |
| 5,589,643 A | 12/1996 | Pyle |
| 5,596,151 A * | 1/1997 | Rossini .................. 73/861.55 |

FOREIGN PATENT DOCUMENTS

| DE | 2913477 | 10/1980 |
| GB | 2244337 | 11/1991 |

* cited by examiner

Primary Examiner—Benjamin R. Fuller
Assistant Examiner—Charlene Dickens
(74) Attorney, Agent, or Firm—Dowell & Dowell, P.C.

(57) ABSTRACT

Flow indicator with the purpose to indicate direction of the air flow between two rooms separated by a wall. The indicator comprises a tube (12) that is mounted in an opening of the wall (10). Inside the tube is a smooth-running body (16) mounted that easily moves towards the end of the tube by pressure difference arised air flow. Both ends of the tube are provided with end-stops (18) that are constructed to prevent the body (16) to leave the tube and are provided with one or more openings (20) that admits air to pass into the interior of the tube.

8 Claims, 1 Drawing Sheet

INDICATOR FOR REFLECTING DIRECTION OF AIRFLOW BETWEEN TWO ROOMS

BACKGROUND OF THE INVENTION

1. Field of the Invention

The present invention refers to a flow indicator to indicate direction of airflow between two rooms.

2. Description of the Related Art

Within many buildings, as industrial departments, laboratories etc., it is of importance to know the direction of the airflow between two rooms. In manufacturing of pharmaceuticals, as for an example, this information is essential to prevent contaminated airflow in the wrong direction. The flow indicators that are known have solved this with a "flap" or other suitable means in an opening between the rooms to show the direction of the airflow. A disadvantage is, however, that if an airflow is obtained in the wrong direction, unacceptable air will flow in to the protected room before any steps to change the direction of the flow or the pressure difference has been taken.

SUMMARY OF THE INVENTION

The object of the present invention is to achieve a flow indicator that eliminates the disadvantages mentioned above in connection with known flow indicators.

This task is solved by giving the flow indicator according to the invention the characteristics of including a tube communicating with two rooms through a sealed passageway and in which a body is movable by differential air pressure or airflow and wherein the body is engageable with seals in the ends of the tube to thereby prevent airflow through the tube in the direction of the airflow.

BRIEF DESCRIPTION OF THE DRAWINGS

The invention will now be described with reference to an embodiment shown in the drawings, wherein.

DESCRIPTION OF THE PREFERRED EMBODIMENT

Figure 2:
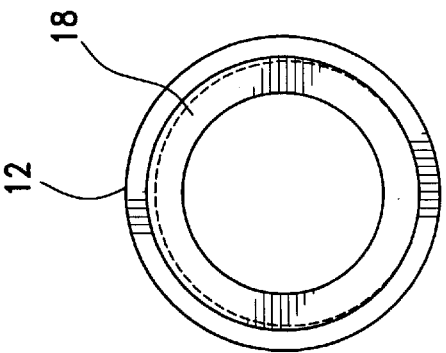
FIG. 2 shows the flow indicator in a cross sectional view.
Figure 1:
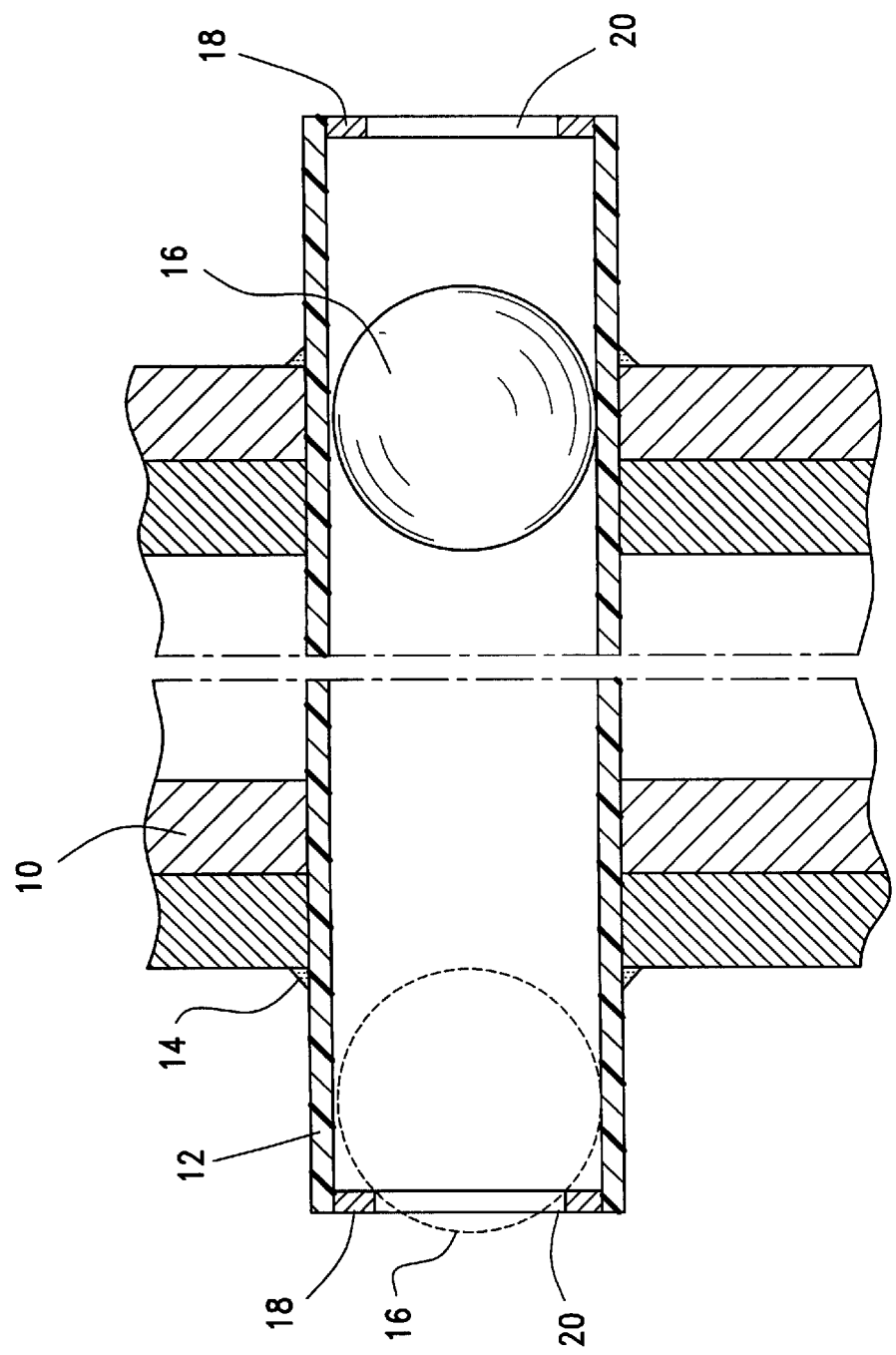
FIG. 1 shows the flow indicator cut lengthwise inside a wall.

In wall 10 a hole is made in which a tube 12 is mounted. The material of the tube can be for an example plastic, glass, or other similar material, preferably transparent. The tube 12 has a small tolerance in relation to the opening in the wall and is preferably sealed against both sides of the wall with a suitable sealing material 14. Inside the tube 12 a smooth-running solid body 16 is placed which, in the embodiment shown, has a spherical shape and which easily moves inside the tube under influence of an even light airflow.

The body 16 can be made of a thin plastic material of the same kind as table tennis balls. At both ends of the tube there are end-stops 18 in the form of seals that prevent the body 16 from leaving the tube. Each end-stop is provided with an opening 20 that makes it possible for the air to pass into the tube 12 and move the smooth-running body 16.

If the flow indicator is placed between rooms with different pressures, the function of the described flow indicator is that the body 16 placed in the tube 12 moved towards the end-stop that faces the room with the lowest pressure because of the airflow. As the body moves with small tolerance in relation to the wall of the tube, only a fragment of the flow will pass between the rooms and when the body reaches the end-stop 18, it will generate a complete sealing that stops air to pass into the room with the lower pressure. As the tube is made by transparent material the body 16 is easy to see and if the body is spherical, as in the example, a part of the spheroids perimeter will pop out at the opening 20 of an end-stop 18 and the direction of the airflow can easily be detected.

Of course, the shown embodiment is only an example of the invention and can easily be changed within the scope of the enclosed patent claims. Thus, the body 16, instead of being spheroid, can be in a shape of a cylindrical piston that moves easily in the tube 12 and with its end surface sealing towards the end-stop 18.

What is claimed is:

1. Flow indicator to indicate in each of two rooms separated by a wall of a direction of airflow between the two rooms separated by the wall, the flow indicator including a cylindrical tube that is adapted to be mounted through and sealed in an opening through the wall through which the tube passes between opposite sides of the wall, a smooth-running body disposed inside the tube which body easily moves between the opposite ends of the tube due to a pressure difference caused by airflow between the two rooms, an end stop seal provided adjacent each of the opposite ends of the tube arranged to prevent the body from leaving the tube, and said end stop seals being provided with openings which admit air to pass into the tube and which are so shaped that the body, when it reaches one of the end stop seals, sealingly closes the opening of said one of the end stop seals to prevent airflow through the tube and to thereby provide a visual indication in each of the two rooms of the direction of airflow.

2. Flow indicator according to claim 1, wherein said smooth-running body is a spherical body, the opening of each of the end stop seals having a dimensions such that a part of the spherical body is exposed outside the one of the end stop seals when the body is engaging the one of the end stop seals.

3. Flow indicator according to claim 2 wherein the ends of the tube are of a length to extend outwardly relative to the opposite sides of the wall in which the tube is adapted to be mounted.

4. Flow indicator according to claim 3 wherein the cylindrical tube is formed of transparent material.

5. Flow indicator according to claim 2 wherein the cylindrical tube is formed of transparent material.

6. Flow indicator according to claim 1 wherein the ends of the tube are of a length to extend outwardly relative to the opposite sides of the wall in which the tube is adapted to be mounted.

7. Flow indicator according to claim 6 wherein the cylindrical tube is formed of transparent material.

8. Flow indicator according to claim 1 wherein the cylindrical tube is formed of transparent material.

* * * * *